US012712208B2

(12) United States Patent
Zhang et al.

(10) Patent No.: US 12,712,208 B2

(45) Date of Patent: Aug. 18, 2026

(54) ELECTROLYTE SOLUTION, SECONDARY BATTERY AND ELECTRICAL APPARATUS

(71) Applicant: CONTEMPORARY AMPEREX TECHNOLOGY CO., LIMITED, Ningde (CN)

(72) Inventors: Rupeng Zhang, Ningde (CN); Hansen Wang, Ningde (CN); Chengyong Liu, Ningde (CN); Pan Wan, Ningde (CN); Yuchun Wang, Ningde (CN); Fuxiang Feng, Ningde (CN); Shengyuan Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/295,916

(22) Filed: Aug. 11, 2025

(65) Prior Publication Data

US 2025/0364602 A1 Nov. 27, 2025

Related U.S. Application Data

(63) Continuation of application No. PCT/CN2024/086825, filed on Apr. 9, 2024.

(30) Foreign Application Priority Data

Aug. 24, 2023 (CN) ......................... 202311071840.2

(51) Int. Cl.

*H01M 10/0569* (2010.01)
*H01M 10/052* (2010.01)

(52) U.S. Cl.

CPC ..... *H01M 10/0569* (2013.01); *H01M 10/052* (2013.01); *H01M 2300/0034* (2013.01); *H01M 2300/0037* (2013.01)

(58) Field of Classification Search

CPC ........... H01M 10/0569; H01M 10/052; H01M 2300/0034; H01M 2300/0037

(Continued)

(56) References Cited

U.S. PATENT DOCUMENTS

2021/0104726 A1* 4/2021 Matsumoto ....... H01M 10/0525
2023/0100910 A1* 3/2023 Zhang ............... H01M 10/0569 429/322

FOREIGN PATENT DOCUMENTS

CN 105470571 A 4/2016
CN 114142088 A 3/2022

(Continued)

OTHER PUBLICATIONS

The World Intellectual Property Organization (WIPO) International Search Report and Written Opinion for PCT/CN2024/086825 Jun. 20, 2024 13 Pages (including translation).

(Continued)

*Primary Examiner* — Allison Bourke
*Assistant Examiner* — Robert Gene West
(74) *Attorney, Agent, or Firm* — ANOVA LAW GROUP, PLLC

(57) ABSTRACT

An electrolyte solution, a secondary battery, and an electrical apparatus. Components of the electrolyte solution include an electrolyte salt and a fluorine-containing sulfonamide solvent. The fluorine-containing sulfonamide solvent includes a compound represented by formula (1) in the disclosure, wherein T1 is selected from any one of the following formulas (1-1) to (1-3) in the disclosure: $R_1$ and $R_2$ are each independently selected from any one of alkyl having 1-3 carbon atoms, phenyl, and a sulfone group; $T_2$ is fluorine-substituted alkyl group having 1-4 carbon atoms; and * represents a site of connection.

15 Claims, 3 Drawing Sheets

(58) Field of Classification Search
USPC .......................................................... 429/326
See application file for complete search history.

(56) References Cited

FOREIGN PATENT DOCUMENTS

| | | | |
|---|---|---|---|
| CN | 114520372 | A | 5/2022 |
| CN | 114639873 | A | 6/2022 |
| CN | 116154300 | A | 5/2023 |
| JP | 2014186957 | A | 10/2014 |
| JP | 2014194866 | A | 10/2014 |
| JP | 2015072858 | A | 4/2015 |
| WO | 2023134691 | A1 | 7/2023 |

OTHER PUBLICATIONS

State Intellectual Property Office of China The First Office Action for Application No. 202311071840.2, Sep. 2, 2025 14 pages (including translation).
The European Patent Office (EPO) The Extended European Search Report for Application No. 24855309.1 Mar. 30, 2026 8 Pages.

* cited by examiner

ELECTROLYTE SOLUTION, SECONDARY BATTERY AND ELECTRICAL APPARATUS

CROSS-REFERENCE TO RELATED APPLICATIONS

The present application is a continuation of International Application No. PCT/CN2024/086825, filed on Apr. 9, 2024, which claims priority to Chinese patent application No. 202311071840.2, filed on Aug. 24, 2023 and entitled "ELECTROLYTE SOLUTION, SECONDARY BATTERY AND ELECTRICAL APPARATUS", which are incorporated herein by reference in their entirety.

TECHNICAL FIELD

The present application relates to the technical field of batteries, particularly to an electrolyte solution, a secondary battery, and an electrical apparatus.

BACKGROUND

Secondary batteries such as lithium batteries are increasingly widely used due to their clean and renewable characteristics. Lithium-ion secondary batteries have been widely used in many fields such as consumer electronics, electric vehicles, and energy storage.

In order to meet the demand for higher energy density of batteries in application fields such as long-range electric vehicles and electric aircrafts, metal lithium secondary batteries with higher energy density have been developed, which have broad application prospects in the fields of long-range power batteries, electric aircrafts, and electric aircrafts. However, the improvement of the performance of lithium metal batteries is severely restricted by electrolyte solutions. Traditional electrolyte solutions easily decompose and cause the growth of lithium dendrites, which has a relatively significant negative impact on key performance indicators of batteries, e.g., cycling performance and rate performance and easily leads to safety accidents in severe cases.

Therefore, traditional technology needs to be further improved.

SUMMARY

According to various embodiments of the present application, the present application provides an electrolyte solution, a secondary battery, and an electrical apparatus, aiming to improve the rate performance and cycling performance of the battery.

The present application is implemented by the following technical solution.

In a first aspect of the present application, an electrolyte solution is provided. The components of the electrolyte solution include an electrolyte salt and a fluorine-containing sulfonamide solvent, and the fluorine-containing sulfonamide solvent includes a compound represented by formula (1):

(1)

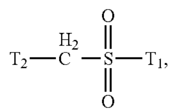

where T1 is selected from any one of the following formulas (1-1) to (1-3):

(1-1_

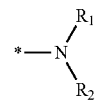

(1-2)

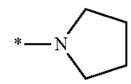

(1-3)

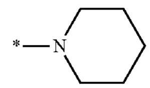

$R_1$ and $R_2$ are each independently selected from any one of alkyl having 1-3 carbon atoms, phenyl, and a sulfone group;

$T_2$ is fluorine-substituted alkyl having 1-4 carbon atoms; and

* represents a site of connection.

The above electrolyte solution contains a fluorine-containing sulfonamide solvent with a specific structure. The compound represented by formula (1) contains a sulfonamide group, fluorine-substituted alkyl having 1-4 carbon atoms with a strong electron-withdrawing property is connected to one side of the sulfonamide group, and the sulfonamide group and the fluorine-substituted alkyl having 1 to 4 carbon atoms are not directly connected, but are separated by a carbon atom. Thus, on the one hand, by introducing the group having a stronger electron-withdrawing property than the sulfonyl functional group on one side of the sulfonamide group to reduce the coordination ability of the sulfonyl functional group in the compound represented by formula (1) with lithium ions, the coordination ability of the entire fluorine-containing sulfonamide solvent with lithium ions is weaker than the coordination ability of anions in an inner layer solvation sheath structure of lithium ions. In other words, the coordination number of the anions is substantially increased, which makes it easier to obtain electrons for reduction and decomposition to form a dense interface film mainly composed of inorganic substances, which has a lower diffusion energy barrier and a faster transmission rate. This can particularly improve the coordination number of anions with lithium ions diffused to the electrolyte solution portion (i.e., the bulk phase electrolyte solution portion) at the electrode interface. On the other hand, by separating the sulfonamide group from the group with strong electron-withdrawing property by one carbon atom, the β-position carbon atom connected to the sulfonamide group or the carbon atom farther away from the sulfonamide group than the β-position carbon atom is substituted with fluorine, and the electron-withdrawing ability of the sulfonyl functional group in the compound represented by formula (1) and the electron-withdrawing ability of the group moiety to which it is connected maintain an appropriate gap, so that the sulfonyl functional group still has a certain ability to coordinate with lithium ions, making the compound represented by formula (1) still have a higher donor number, thereby improving the ability to dissolve the electrolyte lithium salt and making the electrolyte solution have both good anion coordination performance and good ion conductivity. When used in the preparation of a secondary battery, it can simultaneously improve the rate performance and cycling performance of the battery.

In addition, the fluorine-containing sulfonamide solvent with the above specific structure can reduce the solubility of the decomposition products at the positive electrode interface, improve the stability of the interface film, inhibit the penetration of the electrolyte into the positive electrode intergranular particles, avoid chemical corrosion at the positive electrode grain boundaries, and improve the phase stability of the positive electrode. In addition, the above electrolyte solution has low solubility for the corrosion products of the aluminum foil current collector, e.g., $Al(FSI)_3$, which reduces the negative impact of such corrosion products and can further slow down the high-voltage corrosion of the current collector.

In particular, when the above electrolyte solution is used to prepare lithium metal secondary batteries, it is beneficial to the uniform deposition of lithium ions and inhibits the growth of dendrites.

In some embodiments, the structure of $T_2$ is as represented by (A):

(A)

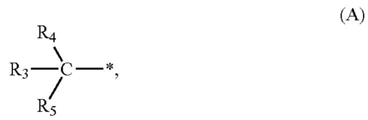

$R_3$ is selected from H, F, alkyl having 1-3 carbon atoms, or fluorine-substituted alkyl having 1-3 carbon atoms, $R_4$ and $R_5$ are each independently selected from H or F, and at least one of $R_4$ and $R_5$ is F.

That is, at least one hydrogen on the β-position carbon atom connected to the sulfonamide group is ensured to be replaced by fluorine, so that the coordination ability of the fluorine-containing sulfonamide solvent and the anion coordination ability can achieve a better balance, thereby further improving the electrolyte solution to achieve both anion coordination performance and good ion conductivity.

Further research has also shown that compared with the fluorine-containing sulfonamide solvent formed by regulation to substitute the carbon atom farther away from the sulfonamide group than the β-carbon atom with fluorine, regulation to replace at least one hydrogen on the β-carbon atom connected to the sulfonamide group by fluorine can improve the ability of the fluorine-containing sulfonamide solvent to dissolve the electrolyte salt on the basis of increasing the coordination number of the anions, thereby further improving the ion conductivity of the electrolyte solution.

In some embodiments, $R_3$ is selected from H or F.

In some embodiments, T1 is selected from formula (1-1), and $R_1$ and $R_2$ are each independently selected from alkyl having 1-3 carbon atoms or phenyl.

When T1 is selected from formula (1-1), the specific structure thereof can enhance the compatibility of the fluorine-containing sulfonamide solvent with the lithium metal negative electrode, so as to effectively reduce the side reaction of the electrolyte solution at the lithium metal negative electrode, thereby further improving the cycling performance of the battery.

Optionally, $R_1$ and $R_2$ are both alkyl having 1-3 carbon atoms.

It has been discovered from research that when $R_1$ and $R_2$ are selected from alkyl with 1-3 carbon atoms, the ion conductivity of the electrolyte solution can be further improved, the viscosity of the electrolyte solution can be reduced, and the cycling performance of the battery can be improved.

In some embodiments, the fluorine-containing sulfonamide solvent includes at least one of compounds represented by formulas (1a) to (1r):

(1a)

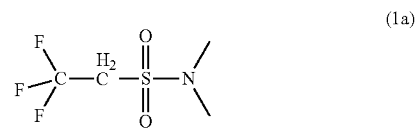

(1b)

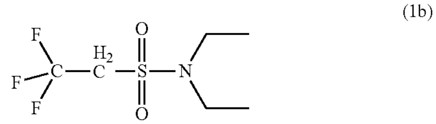

(1c)

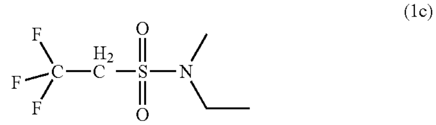

(1d)

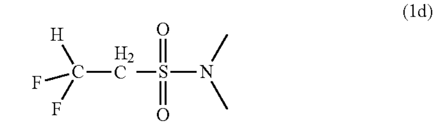

(1e)

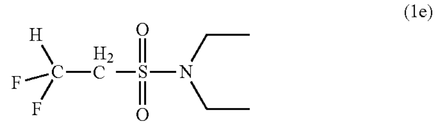

(1f)

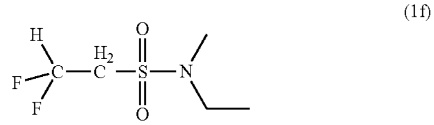

(1g)

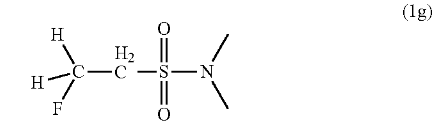

(1h)

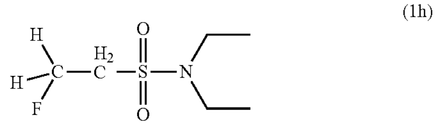

(1i)

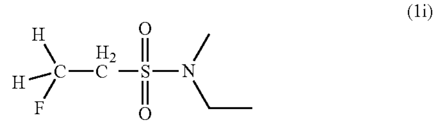

(1j)

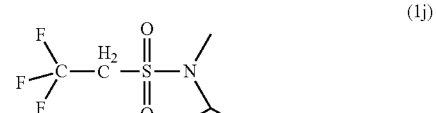

(1k)

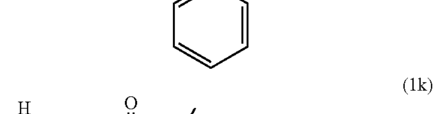

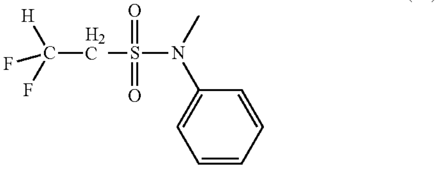

-continued (1l) (1m) (1n) (1o) (1p) (1q) (1r)

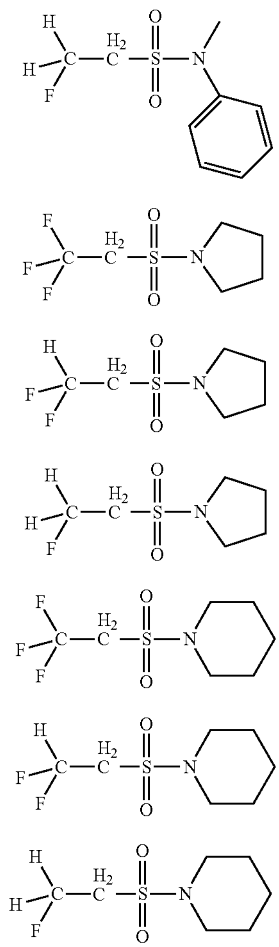

In some embodiments, the components of the electrolyte solution further include a flourine-containing carboxylate solvent.

Optionally, the structure of the flourine-containing carboxylate solvent is as represented by formula (B):

(B)

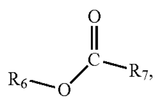

wherein $R_6$ and $R_7$ are each independently selected from any one of alkyl having 1-5 carbon atoms, fluorine-substituted alkyl having 1-5 carbon atoms, cycloalkyl having 3-6 carbon atoms, and fluorine-substituted cycloalkyl having 3-6 carbon atoms, and at least one of $R_6$ and $R_7$ is selected from fluorine-substituted alkyl having 1-5 carbon atoms or fluorine-substituted cycloalkyl having 3-6 carbon atoms.

More optionally, $R_6$ and $R_7$ are each independently selected from alkyl having 1-5 carbon atoms or fluorine-substituted alkyl having 1-5 carbon atoms, and at least one of $R_6$ and $R_7$ is fluorine-substituted alkyl having 1-5 carbon atoms.

The fluorine-containing carboxylate solvent can further improve the ability of coordination between anions and lithium ions, increase the proportion of the coordination number of anions in the bulk phase electrolyte solution portion, which is beneficial to improving the properties of the negative electrode interface and can improve the wettability of the electrolyte solution on the separator. By synergistic combination with the fluorine-containing sulfonamide solvent having the above specific structure, the cycling performance of the secondary battery can be further improved.

In some embodiments, the fluorine-containing carboxylate solvent includes at least one of ethyl 2,2,2-trifluoroacetate, propyl 3,3,3-trifluoropropionate, ethyl difluoroacetate, methyl difluoroacetate, ethyl 3,3,3-trifluoropropionate, and ethyl 3,3-difluoropropionate.

In some embodiments, the volume ratio of the fluorine-containing sulfonamide solvent to the fluorine-containing carboxylate solvent is (0.2-5):1;

optionally, the volume ratio of the fluorine-containing sulfonamide solvent to the fluorine-containing carboxylate solvent is (0.5-3):1;

further optionally, the volume ratio of the fluorine-containing sulfonamide solvent to the fluorine-containing carboxylate solvent is (1.5-2.25):1.

By regulating the volume ratio of the fluorine-containing sulfonamide solvent to the fluorine-containing carboxylate solvent, the coordination ability of the fluorine-containing sulfonamide solvent and the anion coordination ability can achieve a better balance, thereby further improving the electrolyte solution to achieve both anion coordination performance and good ion conductivity.

In some embodiments, in the electrolyte solution, the mass ratio of the electrolyte salt to the fluorine-containing sulfonamide solvent is (0.068-0.68):1.

In some embodiments, the electrolyte solution satisfies at least one of the following conditions (a) to (b):

(a) in the electrolyte solution, the concentration of the electrolyte salt is 0.5-5 mol/L; and (b) the electrolyte salt includes a lithium-ion electrolyte salt.

Optionally, the lithium-ion electrolyte salt includes at least one of lithium bis(fluorosulfonyl)imide, lithium hexafluorophosphate, lithium tetrafluoroborate, lithium hexafluoroarsenate, lithium bis(trifluoromethanesulfonyl)imide, lithium trifluoromethanesulfonate, lithium difluorophosphate, lithium bis(oxalato)borate, lithium difluoro(oxalato)borate, lithium difluorobis(oxalato)phosphate, and lithium tetrafluoro(oxalato)phosphate.

In a second aspect of the present application, a secondary battery is provided. The secondary battery comprises the electrolyte solution according to the first aspect of the secondary battery.

In some embodiments, the above secondary battery includes a lithium metal secondary battery.

The above secondary battery has excellent cycling performance.

A third aspect of the present application provides an electrical apparatus. The electrical apparatus comprises the electrolyte solution according to the first aspect or the secondary battery according to the second aspect.

DESCRIPTION OF DRAWINGS

In order to more clearly illustrate the technical solutions of the embodiments of the present application, the drawings required in the embodiments of the present application will be described briefly below. Apparently, the drawings described below depict merely some embodiments of the present application. For those of ordinary skill in the art, other drawings can also be obtained based on these drawings without any creative effort. In the drawings.

DESCRIPTION OF REFERENCE NUMERALS

Figure 1:
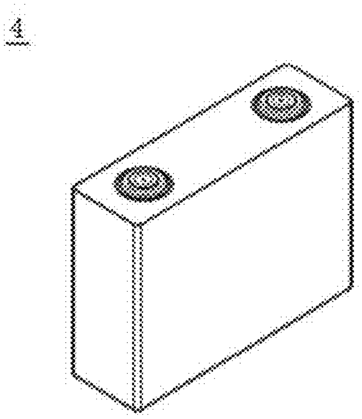
FIG. 1 is a schematic view of an embodiment of a battery cell.

1 battery pack; 2 upper box; 3 lower box; 4 battery cell; 41 case; 42 electrode assembly; 43 cover plate; and 5 electrical apparatus.

DETAILED DESCRIPTION

The embodiments of the technical solutions of the present application will be described in detail below with reference to the accompanying drawings. The following embodiments are only used to more clearly illustrate the technical solutions of the present application, therefore only as examples, and cannot be used to limit the scope of protection of the present application.

Unless otherwise defined, all technical and scientific terms used herein have the same meanings as commonly understood by those skilled in the technical field to which the present application belongs. The terms used herein are intended only for the purpose of describing specific embodiments and are not intended to limit the present application. The terms "include" and "have" and any variations thereof in the specification and the claims of the present application and in the above Description of Drawings are intended to encompass non-exclusive inclusion.

In the description of the embodiments of the present application, the technical terms "first", "second", etc., are used only to distinguish between different objects and are not to be understood as indicating or implying a relative importance or implicitly specifying the number, particular order, or primary and secondary relationship of the technical features indicated. In the description of the embodiments of the present application, the meaning of "a plurality of" is two or more, unless otherwise explicitly and specifically defined.

Reference to "an embodiment" herein means that a particular feature, structure, or characteristic described with reference to an embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In this disclosure, unless otherwise specified, phrases like "at least one of A, B, and C" and "at least one of A, B, or C" both mean only A, only B, only C, or any combination of A, B, and C.

In the present application, the term "alkyl" refers to a group formed after an alkane loses a hydrogen, for example, methane loses a hydrogen to form methyl. The term "alkyl" refers to a group formed by the loss of one hydrogen in an alkane in which all carbon atoms are connected by carbon-carbon single bonds and are acyclic while all the other valence bonds are bound with hydrogen, including linear alkyl and branched alkyl.

In the present application, the carbon number of the "alkyl having 1-5 carbon atoms" may be 1 to 5, including 1, 2, 3, 4, or 5, and non-limiting examples include methyl, ethyl, and n-propyl.

To sum up, as described in the background, the improvement of the performance of traditional secondary batteries, especially lithium metal secondary batteries, is severely restricted by electrolyte solutions. The solvents in traditional electrolyte solutions are mainly ester solvents: carbonates or carboxylates.

It has been discovered from research that a fluorine-containing sulfonamide compound, when used as an additive for an electrolyte solution, can improve the high-voltage resistance of the electrolyte solution and enhance the high-temperature storage performance.

However, it has been discovered from research that when a fluorine-containing sulfonamide compound is used as a solvent for an electrolyte solution, the substitution position of the fluorine atom has a great technical connection with both the anion coordination ability and ion conductivity of the electrolyte solution.

On this basis, after extensive creative exploration, the electrolyte solution of the present application is obtained which can improve the rate and cycling performance of the battery.

In one embodiment of the present application, an electrolyte solution is provided. The components of the electrolyte solution include an electrolyte salt and a fluorine-containing sulfonamide solvent, and the fluorine-containing sulfonamide solvent includes a compound represented by formula (1):

(1)

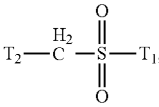

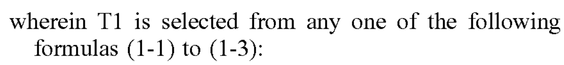

wherein T1 is selected from any one of the following formulas (1-1) to (1-3):

(1-1_

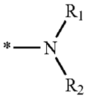

(1-2)

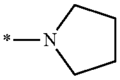

(1-3)

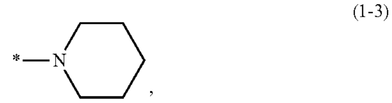

$R_1$ and $R_2$ are each independently selected from any one of alkyl having 1-3 carbon atoms, phenyl, and a sulfone group;

$T_2$ is fluorine-substituted alkyl having 1-4 carbon atoms; and

* represents a site of connection.

The above electrolyte solution contains a fluorine-containing sulfonamide solvent with a specific structure. The compound represented by formula (1) contains a sulfonamide group, fluorine-substituted alkyl having 1-4 carbon atoms with a strong electron-withdrawing property is connected to one side of the sulfonamide group, and the sulfonamide group and the fluorine-substituted alkyl having 1 to 4 carbon atoms are not directly connected, but are separated by a carbon atom. Thus, on the one hand, by introducing the group having a stronger electron-withdrawing property than the sulfonyl functional group on one side of the sulfonamide group to reduce the coordination ability of the sulfonyl functional group in the compound represented by formula (1) with lithium ions, the coordination ability of the entire fluorine-containing sulfonamide solvent with lithium ions is weaker than the coordination ability of anions in an inner layer solvation sheath structure of lithium ions. In other words, the coordination number of the anions is substantially increased, which makes it easier to obtain electrons for reduction and decomposition to form a dense interface film mainly composed of inorganic substances, which has a lower diffusion energy barrier and a faster transmission rate. This can particularly improve the coordination number of anions with lithium ions diffused to the electrolyte solution portion (i.e., the bulk phase electrolyte solution portion) at the electrode interface. On the other hand, by separating the sulfonamide group from the group with strong electron-withdrawing property by one carbon atom, the β-position carbon atom connected to the sulfonamide group or the carbon atom farther away from the sulfonamide group than the β-position carbon atom is substituted with fluorine, and the electron-withdrawing ability of the sulfonyl functional group in the compound represented by formula (1) and the electron-withdrawing ability of the group moiety to which it is connected maintain an appropriate gap, so that the sulfonyl functional group still has a certain ability to coordinate with lithium ions, making the compound represented by formula (1) still have a higher donor number, thereby improving the ability to dissolve the electrolyte lithium salt and making the electrolyte solution have both good anion coordination performance and good ion conductivity. When used in the preparation of a secondary battery, it can simultaneously improve the rate performance and cycling performance of the battery.

In addition, the fluorine-containing sulfonamide solvent with the above specific structure can reduce the solubility of the decomposition products at the positive electrode interface, improve the stability of the interface film, inhibit the penetration of the electrolyte into the positive electrode intergranular particles, avoid chemical corrosion at the positive electrode grain boundaries, and improve the phase stability of the positive electrode. In addition, the above electrolyte solution has low solubility for the corrosion products of the aluminum foil current collector, e.g., $Al(FSI)_3$, which reduces the negative impact of such corrosion products and can further slow down the high-voltage corrosion of the current collector.

In particular, when the above electrolyte solution is used to prepare lithium metal secondary batteries, it is beneficial to the uniform deposition of lithium ions and inhibits the growth of dendrites.

In some embodiments, $R_3$ is selected from H, F, linear alkyl having 1-3 carbon atoms, or fluorine-substituted linear alkyl having 1-3 carbon atoms.

In some embodiments, $R_3$ is selected from H, F, linear alkyl with 1-2 carbon atoms, or fluorine-substituted linear alkyl with 1-2 carbon atoms.

In some embodiments, $R_3$ is selected from any one of H, F, methyl, ethyl, and trifluoromethyl.

In some embodiments, $R_3$ is selected from H or F.

In some embodiments, T1 is selected from formula (1-1).

In some embodiments, $R_1$ and $R_2$ are each independently selected from alkyl having 1-3 carbon atoms or phenyl.

When T1 is selected from formula (1-1), the specific structure thereof can enhance the compatibility of the fluorine-containing sulfonamide solvent with the lithium metal negative electrode, so as to effectively reduce the side reaction of the electrolyte solution at the lithium metal negative electrode, thereby further improving the cycling performance of the battery.

In some embodiments, $R_1$ and $R_2$ are each independently selected from alkyl having 1-3 carbon atoms or phenyl.

In some embodiments, $R_1$ and $R_2$ are each independently selected from methyl, ethyl, or phenyl.

In some embodiments, $R_1$ and $R_2$ are equally selected from alkyl having 1-3 carbon atoms or phenyl.

It has been discovered from research that when $R_1$ and $R_2$ are selected from alkyl with 1-3 carbon atoms, the ion conductivity of the electrolyte solution can be further improved, the viscosity of the electrolyte solution can be reduced, and the cycling performance of the battery can be improved.

In some embodiments, $R_1$ and $R_2$ are both alkyl having 1-3 carbon atoms.

In some embodiments, $R_1$ and $R_2$ are each independently selected from methyl, ethyl, or propyl.

In some embodiments, $R_1$ and $R_2$ are both equally selected from methyl, ethyl, or propyl.

In some embodiments, the fluorine-containing sulfonamide solvent includes at least one of compounds represented by formulas (1a) to (1r):

(1a)

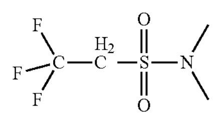

(1b)

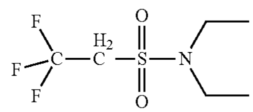

(1c)

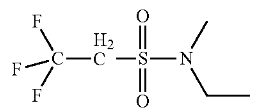

(1d)

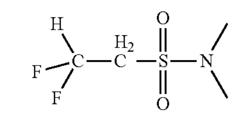

(1e)

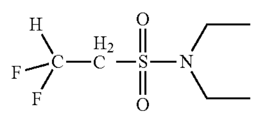

(1f)

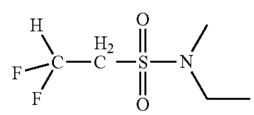

-continued (1g)

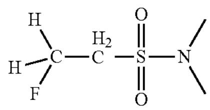

(1h)

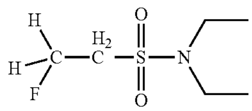

(1i)

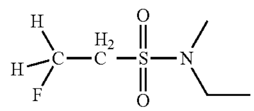

(1j)

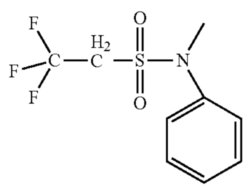

(1k)

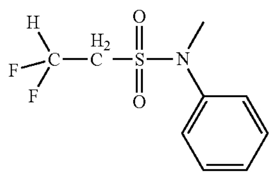

(1l)

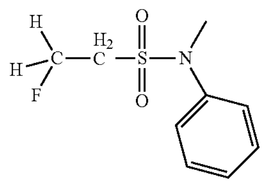

(1m)

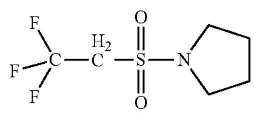

(1n)

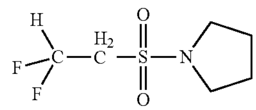

(1o)

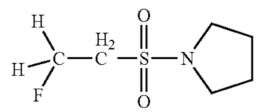

(1p)

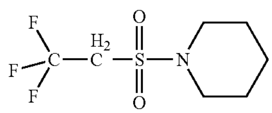

(1q)

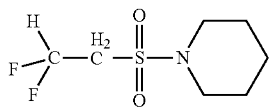

-continued (1r)

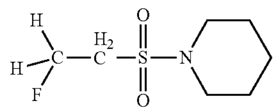

The compound represented by the above formula (1) can be either purchased from commercial channels or synthesized by the following preparation method:

The compound of formula (A) is subjected to a substitution reaction with the compound of formula (B) to prepare a compound of formula (1). The compound of formula (B) includes at least one of the compounds of formula (B-1) to (B-3).

(A)

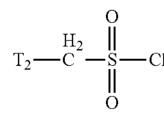

(B-1)

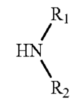

(B-2)

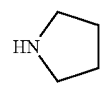

(B-3)

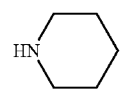

The selection of $T_2$, $R_1$, and $R_2$ is the same as above and will not be described in detail here.

In some embodiments, the above substitution reaction is carried out under alkaline conditions; furthermore, the alkaline environment is regulated by adding an alkaline substance.

In some embodiments, the alkaline substance includes at least one of an organic base and an inorganic base.

In some embodiments, the organic base includes organic amine substances, and specific examples include but are not limited to triethylamine.

In some embodiments, the above substitution reaction is carried out in an organic solvent; furthermore, the organic solvent includes, but is not limited to, at least one of tetrahydrofuran and dichloromethane.

In some embodiments, the molar ratio of the compound of formula (A) to the compound of formula (B) is 1:(1-3).

In some embodiments, the molar ratio of the compound of formula (A) to the alkaline substance is 1:(1-3).

In some embodiments, during the substitution reaction, the compound of formula (A) is first added dropwise to a solution containing the compound of formula (B) at 5-10° C. and then reacted at room temperature for 10-20 h.

The room temperature can be 20-35° C.

In some embodiments, the preparation method further comprises a post-treatment step:

The product resulting from the substitution reaction is extracted with an extraction agent, then concentrated to remove the extraction agent, and then distilled under reduced pressure to obtain a purified compound represented by formula (1).

In some embodiments, the extraction agent includes dichloromethane.

The above preparation method is simple to operate, has mild conditions, produces few by-products, and can achieve a relatively high yield.

In some embodiments, the components of the electrolyte solution further include a fluorine-containing carboxylate solvent.

It has been discovered from research that the fluorine-containing carboxylate solvent, in synergistic combination with the compound represented by the above formula (1), can further improve the ability of coordination between anions and lithium ions, increase the proportion of the coordination number of anions in the bulk phase electrolyte solution portion, which is beneficial to improving the properties of the negative electrode interface and can improve the wettability of the electrolyte solution on the separator. By synergistic combination with the fluorine-containing sulfonamide solvent having the above specific structure, the cycling performance of the secondary battery can be further improved.

In some embodiments, the structure of the fluorine-containing carboxylate solvent is as represented by formula (B):

(B)

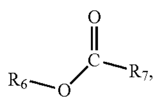

wherein $R_6$ and $R_7$ are each independently selected from any one of alkyl having 1-5 carbon atoms, fluorine-substituted alkyl having 1-5 carbon atoms, cycloalkyl having 3-6 carbon atoms, and fluorine-substituted cycloalkyl having 3-6 carbon atoms, and at least one of $R_6$ and $R_7$ is selected from fluorine-substituted alkyl having 1-5 carbon atoms or fluorine-substituted cycloalkyl having 3-6 carbon atoms.

In some embodiments, $R_6$ and $R_7$ are each independently selected from alkyl having 1-5 carbon atoms or fluorine-substituted alkyl having 1-5 carbon atoms, and at least one of $R_6$ and $R_7$ is fluorine-substituted alkyl having 1-5 carbon atoms.

In some embodiments, $R_6$ and $R_7$ are each independently selected from alkyl having 1-3 carbon atoms or fluorine-substituted alkyl having 1-3 carbon atoms, and at least one of $R_6$ and $R_7$ is fluorine-substituted alkyl having 1-3 carbon atoms.

In some embodiments, $R_6$ and $R_7$ are each independently selected from any one of methyl, ethyl, propyl, fluorine-substituted methyl, fluorine-substituted ethyl, or fluorine-substituted propyl.

In some embodiments, at least one of $R_6$ and $R_7$ is selected from fluorine-substituted methyl, fluorine-substituted ethyl, or fluorine-substituted propyl.

In the present application, "propyl" includes at least one of n-propyl and isopropyl.

In some embodiments, the fluorine-containing carboxylate solvent includes at least one of ethyl 2,2,2-trifluoroacetate, propyl 3,3,3-trifluoropropionate, ethyl difluoroacetate, methyl difluoroacetate, ethyl 3,3,3-trifluoropropionate, and ethyl 3,3-difluoropropionate.

In some embodiments, the volume ratio of the fluorine-containing sulfonamide solvent to the fluorine-containing carboxylate solvent is (0.2-5):1.

In some embodiments, the volume ratio of the fluorine-containing sulfonamide solvent to the fluorine-containing carboxylate solvent is (0.5-3):1.

In some embodiments, the volume ratio of the fluorine-containing sulfonamide solvent to the fluorine-containing carboxylate solvent is (1.5-2.25):1.

By regulating the volume ratio of the fluorine-containing sulfonamide solvent to the fluorine-containing carboxylate solvent, the coordination ability of the fluorine-containing sulfonamide solvent and the anion coordination ability can achieve a better balance, thereby further improving the electrolyte solution to achieve both anion coordination performance and good ion conductivity.

In the above "(0.2-5):1", the values include the minimum and maximum values of the range, and every value between the minimum and maximum values. Specific examples include but are not limited to the point values in the embodiments and the following point values: 5:1, 4:1, 3:1, 2:1, 1:1, 0.5:1, 0.4:1, 0.3:1, and 0.2:1; or a range formed by any two numerical values, for example, it can be (0.2-5):1, (0.2-4):1, (0.2-3):1, (0.5-5):1, (0.5-4):1, (0.5-3):1, (0.5-2.5):1, (1-5):1, (1-4):1, (1-3):1, (2-5):1, (2-4):1, or (2-3):1.

In some embodiments, in the electrolyte solution, the mass ratio of the electrolyte salt to the fluorine-containing sulfonamide solvent is (0.068-0.68):1.

In the above "(0.068-0.68):1", the values include the minimum and maximum values of the range, and every value between the minimum and maximum values. Specific examples include but are not limited to the point values in the embodiments and the following point values: 0.68:1, 0.6:1, 0.58:1, 0.55:1, 0.5:1, 0.45:1, 0.4:1, 0.35:1, 0.3:1, 0.25:1, 0.2:1, 0.15:1, 0.1:1, 0.08:1, and 0.07:1; or a range formed by any two numerical values, for example, it can be (0.07-0.6):1, (0.08-0.5):1, (0.068-0.4):1, (0.068-0.3):1, (0.068-0.2):1, (0.068-0.1):1, (0.1-0.5):1, (0.1-0.4):1, (0.1-0.3):1, (0.1-0.2):1, (0.2-0.5):1, (0.2-0.4):1, (0.2-0.3):1, or (0.2-0.6):1.

In some embodiments, in the electrolyte solution, the concentration of the electrolyte salt is 0.5-5 mol/L.

In some embodiments, the concentration of the electrolyte salt is 1-3 mol/L.

In some embodiments, the concentration of the electrolyte salt is 1.5-2.5 mol/L.

In a specific example, the concentration of the electrolyte salt is 2 mol/L.

The concentration of the electrolyte salt is adjusted to achieve a balance between a relatively high ion conductivity and a relatively low viscosity, further improving the positive impact of the electrolyte solution on the stability of the positive and negative electrodes. In some embodiments, the electrolyte salt can be selected from electrolyte salts commonly used in the art, e.g., at least one of a lithium-ion electrolyte salt, a sodium-ion electrolyte salt, and a potassium-ion electrolyte salt.

In some embodiments, the above electrolyte salt includes a lithium-ion electrolyte salt.

By way of example, the lithium-ion electrolyte salt includes but is not limited to one or more of $LiNO_3$, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate (LiPO2F2), lithium difluoro bis(oxalato)phosphate (LiDFOP), and lithium tetrafluoro(oxalato)phosphate (LiTFOP).

It has been discovered from research that the above electrolyte solution has good solubility for the above lithium-ion electrolyte salt; furthermore, compared with other types of lithium-ion electrolyte salts, the solubility for $LiNO_3$ is slightly worse.

Optionally, the lithium-ion electrolyte salt includes at least one of lithium bis(fluorosulfonyl)imide, lithium hexafluorophosphate, lithium tetrafluoroborate, lithium hexafluoroarsenate, lithium bis(trifluoromethanesulfonyl) imide, lithium trifluoromethanesulfonate, lithium difluorophosphate, lithium bis(oxalato)borate, lithium difluoro(oxalato)borate, lithium difluorobis(oxalato)phosphate, and lithium tetrafluoro(oxalato)phosphate.

In an embodiment of the present application, a secondary battery is provided. The secondary battery comprises the electrolyte solution according to the first aspect of the secondary battery.

In some embodiments, the secondary battery further comprises a positive electrode plate, a negative electrode plate, and a separator.

Positive electrode plate: The positive electrode plate comprises a current collector and a positive electrode active layer loaded on a surface of the current collector.

The components of the positive electrode active layer include a positive electrode active material. The positive electrode active material can be any positive electrode active material commonly used in the art, including but not limited to positive electrode active materials for lithium-ion batteries, positive electrode active materials for sodium-ion batteries, and positive electrode active materials for potassium-ion batteries.

The positive electrode active materials for lithium-ion batteries, positive electrode active materials for sodium-ion batteries, and positive electrode active materials for potassium-ion batteries are hereinafter briefly referred to as lithium-ion active materials, sodium-ion active materials, and potassium-ion active materials, respectively.

Furthermore, by way of example, the lithium-ion active materials can include at least one of the following materials: a lithium-containing phosphate with an olivine structure, a lithium transition metal oxide, and respective modified compounds thereof. However, the present application is not limited to these materials, and other traditional materials that can be used as positive electrode active materials for batteries may also be used. Only a single one of or a combination of two or more of these positive electrode active materials can be used. Examples of lithium transition metal oxides can include, but are not limited to, at least one of lithium cobalt oxide (e.g., $LiCoO_2$), lithium nickel oxide (e.g., $LiNiO_2$), lithium manganese oxide (e.g., $LiMnO_2$ and $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also abbreviated as NCM333), $LiNi_{0.5}Co_{0.2}Mn_{0.3}O_2$ (also abbreviated as NCM523), $LiNi_{0.5}Co_{0.25}Mn_{0.25}O_2$ (also abbreviated as NCM211), $LiNi_{0.6}Co_{0.2}Mn_{0.2}O_2$ (also abbreviated as NCM622), $LiNi_{0.5}Co_{0.1}Mn_{0.1}O_2$ (also abbreviated as NCM811)), lithium nickel cobalt aluminum oxide (e.g., $LiNi_{0.85}Co_{0.15}Al_{0.05}O_2$), modified compounds thereof, etc. Examples of the lithium-containing phosphate with an olivine structure can include, but are not limited to, at least one of lithium iron phosphate (e.g., $LiFePO_4$, abbreviated as LFP), lithium manganese phosphate (e.g., $LiMnPO_4$), and lithium iron manganese phosphate. In any embodiment of the present application, the molecular formula of the lithium-ion active material is: $LiFe_xMn_{(1-x)}PO_4$, wherein x is any number from 0 to 1.

It can be understood that when x is 0, $LiFe_xMn_{(1-x)}PO_4$ is $LiMnPO_4$ (lithium manganese phosphate), and when x is 1, $LiFePO_4$ is $LiFePO_4$ (lithium iron phosphate (LFP)).

It needs to be noted that the lithium content of the positive electrode material exemplified above refers to the content when it is not in service. During the service of the battery, repeated charging is carried out, and the Li in the positive electrode active material changes during the charging and discharging process, that is, the molar subscript of Li in the positive electrode active material in the battery product does not always remain at 1, but varies; furthermore, the range of variation can be (0-1.2).

For example, $LiFe_xMn_{(1-x)}PO_4$ can be further expressed as $Li_yFe_xMn_{(1-x)}PO_4$, wherein y is 0-1.1.

For example, for the ternary material $Li_y(Ni_aCo_bMn_c)_{1-d}M_dO_{2-x}A_x$, y is 0.2-1.2, a+b+c=1, $0 \le d \le 1$, and $0 \le x < 2$; M is one or more of Zr, Sr, B, Ti, Mg, Sn, and Al, and A is one or more of S, N, F, Cl, Br, and I.

The charging and discharging process of the battery is accompanied by deintercalation and consumption of Li, the molar content of Li varies as the state to which the battery is discharged varies. The above definition of y includes the molar content of Li in different charge-discharge states of the battery; furthermore, the voltage of the battery is generally between 2 V and 5 V.

By way of example, the sodium-ion active material can include at least one of the following materials: a sodium transition metal oxide, a polyanionic compound, and a Prussian blue compound. However, the present application is not limited to these materials, and other traditional well-known materials that can be used as positive electrode active materials for sodium-ion batteries may also be used.

As an optional technical solution of the present application, in the sodium transition metal oxide, the transition metal at least includes at least one of Mn, Fe, Ni, Co, Cr, Cu, Ti, Zn, V, Zr, and Ce. The sodium transition metal oxide is, for example, $Na_xMO_2$, wherein M at least includes one or more of Ti, V, Mn, Co, Ni, Fe, Cr, and Cu, and $0 < x \le 1$.

As an optional technical solution of the present application, the polyanionic compound can be a class of compounds having a sodium ion, a transition metal ion, and a tetrahedral $(YO_4)^{n-}$ anionic unit. The transition metal at least includes at least one of Mn, Fe, Ni, Co, Cr, Cu, Ti, Zn, V, Zr, and Ce; Y at least includes at least one of P, S, and Si; and n represents the valence state of $(YO_4)^{n-}$.

The polyanionic compounds can also be a class of compounds having a sodium ion, a transition metal ion, a tetrahedral $(YO_4)^{n-}$ anionic unit, and a halogen anion. The transition metal at least includes at least one of Mn, Fe, Ni, Co, Cr, Cu, Ti, Zn, V, Zr, and Ce; Y at least includes at least one of P, S, and Si, n represents the valence state of $(YO_4)^{n-}$; and the halogen can be one or more of F, Cl, and Br.

The polyanionic compound can also be a class of compounds having a sodium ion, a tetrahedral $(YO_4)^{n-}$ anionic unit, the polyhedral unit $(ZO_y)^{m+}$, and optionally a halogen anion. Y at least includes at least one of P, S, and Si, n represents the valence state of $(YO_4)^{n-}$; Z represents a transition metal and at least includes at least one of Mn, Fe, Ni, Co, Cr, Cu, Ti, Zn, V, Zr, and Ce, and m represents the valence state of $(ZO_y)^{m+}$; and the halogen can be at least one of F, Cl, and Br.

The polyanionic compound is, for example, at least one of $NaFePO_4$, $Na_3V_2(PO_4)_3$ (sodium vanadium phosphate, abbreviated as NVP), $Na_4Fe_3(PO_4)_2(P_2O_7)$ (NFPP), $NaM1PO_4F$, and $Na_3(VO_y)_2(PO_4)_2F_{(3-2y)}$.

M1 is at least one of V, Fe, Mn, and Ni, and $0 \le y \le 1$.

The Prussian blue compound can be a class of compounds having a sodium ion, a transition metal ion, and a cyanide ion ($CN^-$). The transition metal at least includes at least one of Mn, Fe, Ni, Co, Cr, Cu, Ti, Zn, V, Zr, and Ce. The Prussian blue compound is, for example, $Na_aM2_bM3_c(CN)_6$, wherein M2 and M3 are each independently selected from at least one of Ni, Cu, Fe, Mn, Co, and Zn, $0<a\leq 2$, $0<b<1$, and $0<c<1$.

In any embodiment of the present application, in the positive electrode active layer, the mass proportion of the positive electrode active material is 70-99.8%.

In any embodiment of the present application, the components of the positive electrode active layer further include a conductive agent and a binder.

Taking the above electrode plate as the positive electrode for example, the conductive agent can be a conductive agent commonly used in the art, including but not limited to at least one of graphite, carbon nanotubes, nanofibers, carbon black, and graphene. Specifically, it can be selected from at least one of SP, KS-6, acetylene black, branched Ketjen black ECP, SFG-6, vapor-grown carbon fibers (VGCFs), carbon nanotubes (CNTs), graphene, and composite conductive agents thereof.

The binder can be at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, hydrogenated butadiene-acrylonitrile rubber, styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), carboxymethyl chitosan (CMCS), and a fluorine-containing acrylate resin.

Optionally, in the positive electrode active layer, the mass proportion of the conductive agent is 1-20%.

Optionally, in the positive electrode active layer, the mass proportion of the binder is 1-10%.

In some embodiments, the thickness of the above positive electrode active layer is 30-200 μm.

In any embodiment of the present application, the current collector can be a metal foil or a composite current collector. For example, as the metal foil, an aluminum foil can be used. The composite current collector can comprise a polymer material substrate layer and a metal layer formed on at least one surface of the polymer material substrate layer. The composite current collector can be formed by forming a metal material on the polymer material substrate.

In some embodiments, the metal material is selected from any one of aluminum, an aluminum alloy, nickel, a nickel alloy, titanium, a titanium alloy, silver, and a silver alloy.

In some embodiments, the polymer material substrate includes at least one of polypropylene (PP), polyethylene terephthalate (PET), polybutylene terephthalate (PBT), polystyrene (PS), and polyethylene (PE).

In any embodiment of the present application, the positive electrode plate can be prepared by dispersing the above components for preparing a positive electrode plate in a solvent to form a positive electrode slurry; and applying the positive electrode slurry to a current collector, and performing drying and cold pressing processes to obtain the positive electrode plate. The positive electrode slurry has a solid content of 40-80 wt % and a viscosity adjusted to 5000-25000 millipascal·second (mPa·s) at room temperature. The positive electrode slurry is applied to a surface of the positive electrode current collector, dried, and then cold-pressed by a cold rolling mill to form a positive electrode plate.

Furthermore, the solvent includes N-methyl pyrrolidone.

In some of the embodiments, the areal density of the positive electrode active material contained in the positive electrode plate is 0.018 $g/cm^2$ to 0.05 $g/cm^2$.

Areal density of positive electrode active material=mass of positive electrode active material/area of positive electrode plate.

Negative electrode plate: The negative electrode plate comprises a current collector and a negative electrode active layer loaded on a surface of the current collector.

The components of the negative electrode active layer include a negative electrode active material.

The above negative electrode active material can be a negative electrode active material commonly used in the present application.

In any embodiment of the present application, the above negative electrode active material includes mesophase carbon microspheres, graphite, glassy carbon, carbon nanotubes, carbon-carbon composite materials, carbon fibers, hard carbon, soft carbon, silicon-based materials, tin-based materials, magnesium-based materials, iron-based materials, metallic lithium, alloys formed from lithium metal and other metal or non-metallic elements; furthermore, the other metals include at least one of tin (Sn), zinc (Zn), aluminum (Al), magnesium (Mg), silver (Ag), gold (Au), gallium (Ga), indium (In), and foil (Pt), and the non-metallic elements include at least one of boron (B), carbon (C), and silicon (Si).

Optionally, specific examples of the above negative electrode active materials include, but are not limited to, at least one of mesophase carbon microbeads, natural graphite, artificial graphite, graphene, glassy carbon, carbon nanotubes, carbon fibers, hard carbon, soft carbon, iron oxide, tin oxide, silicon oxide, magnesium oxide, silicon-carbon composites, lithium metal, and lithium metal alloys.

In any embodiment of the present application, the above battery is a lithium battery, and the mass proportion of the above negative electrode active material in the negative electrode active layer is 70-100%.

In any embodiment of the present application, the components of the above negative electrode active layer further include a negative electrode conductive agent and a negative electrode binder.

In any embodiment of the present application, the above negative electrode conductive agent can be a conductive material commonly used in the art, including but not limited to at least one of graphite, carbon nanotubes, nanofibers, carbon black, and graphene. Specifically, it can be selected from at least one of SP, KS-6, acetylene black, branched Ketjen black ECP, SFG-6, vapor-grown carbon fibers (VGCFs), carbon nanotubes (CNTs), graphene, and composite conductive agents thereof.

The weight percentage of the negative electrode conductive agent in the negative electrode active layer is 0-20 wt %, based on the total weight of the negative electrode active layer.

The above negative electrode binder can a binder commonly used in the art and can be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

The weight percentage of the negative electrode binder in the negative electrode active layer is 0-30 wt %, based on the total weight of the negative electrode active layer.

In any embodiment of the present application, the negative electrode active layer further comprises optionally other auxiliaries, e.g., a thickener, such as sodium carboxymethyl cellulose (CMC-Na). The weight percentage of other auxiliaries in the negative electrode active layer is 0-15 wt %, based on the total weight of the negative electrode active layer.

In any embodiment of the present application, the current collector in the negative electrode plate can be a metal foil or a composite current collector. For example, as the metal foil, a copper foil can be used.

The composite current collector can comprise a polymer material substrate layer and a metal layer formed on at least one surface of the polymer material substrate layer. The composite current collector can be formed by forming a metal material on the polymer material substrate.

In some embodiments, the metal material is selected from any one of aluminum, an aluminum alloy, nickel, a nickel alloy, titanium, a titanium alloy, silver, and a silver alloy.

In some embodiments, the polymer material substrate includes at least one of polypropylene (PP), polyethylene terephthalate (PET), polybutylene terephthalate (PBT), polystyrene (PS), and polyethylene (PE).

In any embodiment of the present application, the negative electrode plate can be prepared by dispersing the above components for preparing the negative electrode plate, such as a negative electrode active material, a conductive agent, a binder, and any other components, in a solvent (such as deionized water) to form a negative electrode slurry; and applying the negative electrode slurry to a negative electrode current collector, and performing drying and cold pressing processes to obtain the negative electrode plate. The negative electrode slurry has a solid content of 30-70 wt % and a viscosity adjusted to 2000-10000 mPa·s at room temperature. The obtained negative electrode slurry is applied to a surface of the negative electrode current collector, subjected to a drying procedure, and then cold-pressed, for example, by a roll press to form the negative electrode plate.

In some of the embodiments, the areal density of the negative electrode active material contained in the negative electrode plate is 0.005 $g/cm^2$ to 0.03 $g/cm^2$.

Areal density of negative electrode active material=mass of negative electrode active material/area of negative electrode plate.

In some embodiments, the secondary battery is a "lithium metal secondary battery", and no negative electrode active material is added during the preparation of the negative electrode plate. Only the negative electrode current collector or the current collector coated with a conductive agent is used as the nominal negative electrode. The negative electrode current collector does not have the function of a negative electrode in a substantial sense. After the assembled battery is charged for the first time, the element lithium in the positive electrode migrates to the surface of the negative electrode current collector to form a lithium metal layer on the negative electrode current collector, thereby obtaining a negative electrode in the true sense; or a lithium-containing metal plate is directly used as the negative electrode.

Furthermore, the lithium-containing metal plate can be either metallic lithium or an alloy formed from metallic lithium and another metallic element or non-metallic element.

In some embodiments, the other metal elements include at least one of tin (Sn), zinc (Zn), aluminum (Al), magnesium (Mg), silver (Ag), gold (Au), gallium (Ga), indium (In), and platinum (Pt).

In some embodiments, the non-metallic element includes at least one of boron (B), carbon (C), and silicon (Si).

Separator: A separator is provided between the positive electrode plate and the negative electrode plate.

The separator of the present application can be selected from any well-known separator having good chemical stability, mechanical stability, and a porous structure can be selected.

In some embodiments, the material of the separator can be selected from at least one of glass fibers, non-woven fabric, polyethylene, polypropylene, and polyvinylidene fluoride. The separator film can be either a single-layer thin film or a multi-layer composite thin film without special limitations. When the separator film is a multi-layer composite thin film, the material of each layer may be the same or different, which is not particularly limited.

The thickness of the separator is controlled to be 2-15 μm; optionally, the thickness of the separator is controlled to be 2-13 μm.

The shape of the secondary battery of the present application can be cylindrical, prismatic, or in any other shape. For example, FIG. 1 is a battery cell 4 of a secondary battery with a prismatic structure as an example.

Figure 2:
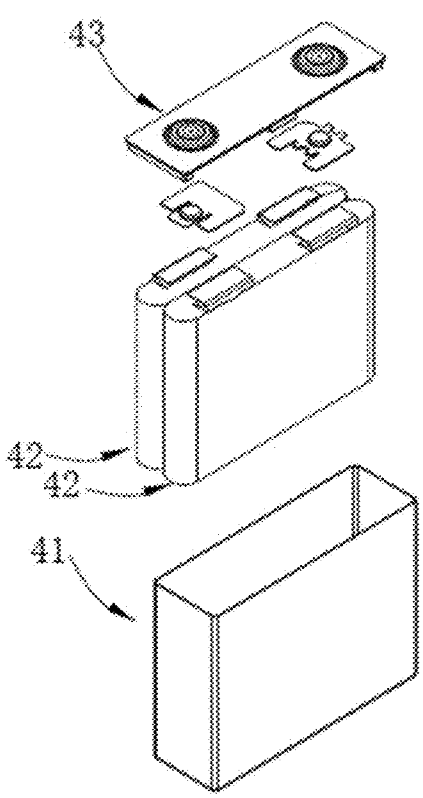
FIG. 2 is an exploded view of FIG. 1.

In some embodiments, referring to FIG. 2, the shell can comprise a case 41 and a cover plate 43. The case 41 can comprise a bottom plate and a side plate connected to the bottom plate, and the bottom plate and the side plate enclose to form an accommodating cavity. The case 41 has an opening in communication with the accommodating cavity, and the cover plate 43 can cover the opening to close the accommodating cavity.

The positive electrode plate, the negative electrode plate, and the separator can be made into an electrode assembly 42 by a winding process or a lamination process. The electrode assembly 42 is encapsulated into the accommodating cavity. An electrolyte solution infiltrates into the electrode assembly 42. A number of electrode assemblies 42 contained in the battery cell 4 can be one or more and can be adjusted according to requirements.

The secondary battery comprises one or more battery cells 4.

The secondary battery can be a battery module or a battery pack. The battery module or the battery pack comprises at least one battery cell. The number of battery cells contained in the battery pack can be one or more, and the appropriate number can be selected by those skilled in the art according to the use and capacity of the battery module.

Figure 3:
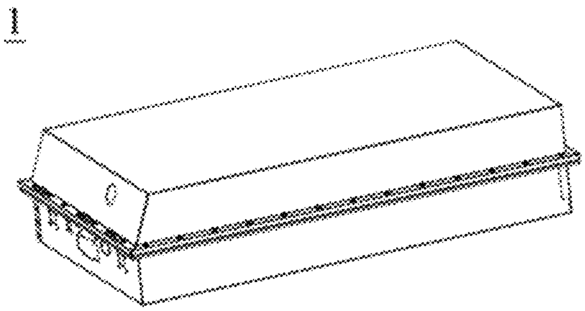
FIG. 3 is a schematic view of an embodiment of a battery pack.
Figure 4:
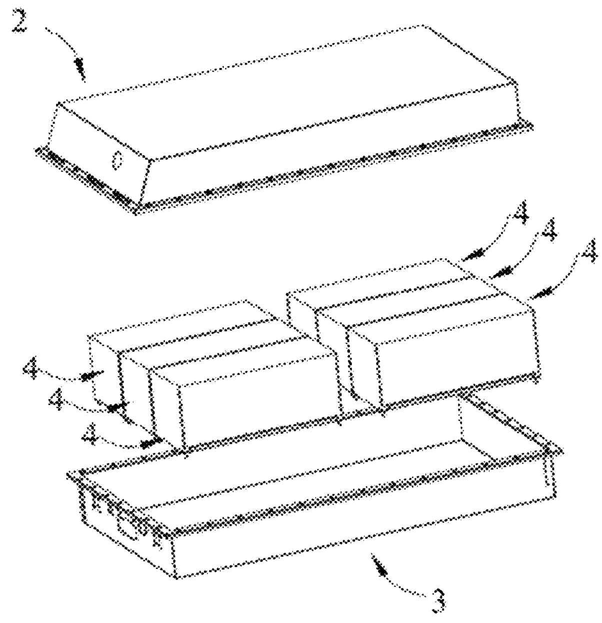
FIG. 4 is an exploded view of FIG. 3.

FIGS. 3 and 4 are a battery pack 1 as an example. The battery pack 1 can comprise a battery box and one or more battery cells 4 provided in the battery box. The battery box comprises an upper box 2 and a lower box 3. The upper box 2 can cover the lower box 3 to form an enclosed space for the battery cell 4.

The plurality of battery cells 4 can be arranged in the battery box in any manner.

The present application further provides an electrical apparatus. The electrical apparatus comprises the above secondary battery.

Furthermore, in the above electrical apparatus, the secondary battery can be either present in the form of a battery cell or further assembled into a battery pack.

The above battery or battery pack assembled therefrom can be used either as a power source for the electrical apparatus or as an energy storage unit for the electrical apparatus.

The above electrical apparatus can include, but is not limited to, a mobile device, an electric vehicle, an electric train, a ship, a satellite, an energy storage system, etc.

The mobile device can include, but is not limited to, a mobile phone and a laptop; and the electric vehicle can include, but is not limited to, an all-electric vehicle, a hybrid electric vehicle, a plug-in hybrid electric vehicle, an electric bicycle, an electric scooter, an electric golf cart, an electric truck, etc.

Figure 5:
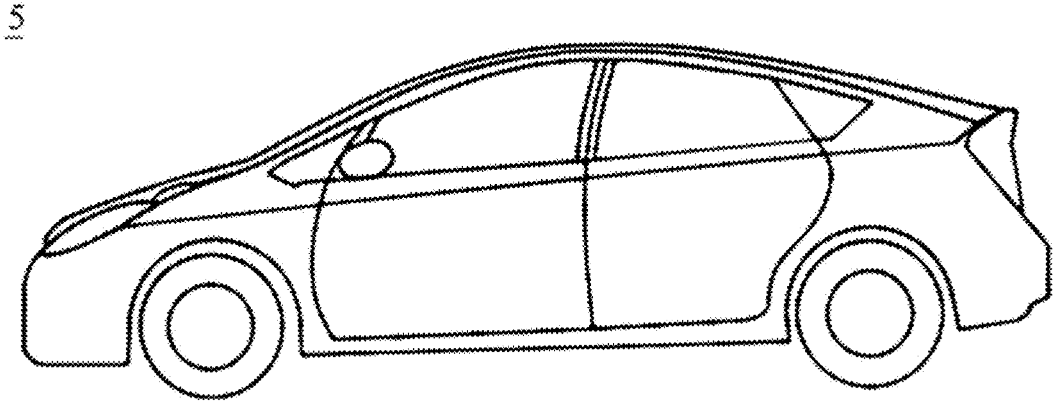
FIG. 5 is a schematic view of an embodiment of an electrical apparatus in which a battery is used as a power source.

FIG. 5 is an electrical apparatus 5 as an example. The electrical apparatus 5 is an all-electric vehicle, a hybrid electric vehicle, or a plug-in hybrid electric vehicle. To satisfy the need of the electrical apparatus 5 for a high power and high energy density of secondary batteries, a battery pack form can be used.

As another example, the electrical apparatus can be a mobile phone, a tablet computer, a laptop, etc. The apparatus is generally required to be light and thin and can use a secondary battery as a power source.

The present application will be explained below in conjunction with specific embodiments. However, the present application is not limited to the following embodiments. It should be understood that the attached claims summarize the scope of the present application. Under the guidance of the concept of the present application, those skilled in the art should realize that certain changes made to the various embodiments of the present application will all be covered by the spirit and scope of the claims of the present application.

The following are specific embodiments.

Example 1

S1. Preparation of Lithium Metal Secondary Battery (1) Preparation of Electrolyte Solution:

The fluorine-containing carboxylate solvent ethyl 3,3,3-trifluoropropionate (FEP) and the fluorine-containing sulfonamide solvent 2,2,2-trifluoro-N,N-dimethylethanesulfonamide (DMTESA) in a volume ratio of 1:2 were fully mixed to form a mixed solvent, and 1.87 g of lithium bis(fluorosulfonyl)imide salt was then added to 5 mL of the mixed solvent and fully stirred to obtain an electrolyte solution for later use.

A gas chromatography test was used. Firstly, pure fluorine-containing sulfonamide and fluorine-containing carboxylate solvents were respectively dissolved in the solvent diethylene glycol dimethyl ether for a chromatographic test, and the solvent components were qualitatively analyzed according to the peak time. In addition, a standard curve was plotted according to the linear relationship between the peak area and mass in gas chromatography. The target electrolyte solution was dissolved in the solvent diethylene glycol dimethyl ether, and the type of the solvent and the mass of the solvent can be determined based on the peak area and peak time. Similarly to the testing principle of gas chromatography, an ion chromatography test method was additionally used, by which the type and mass of the lithium salt could also be obtained. According to the gas chromatography and ion chromatography test methods, the structure of the fluorine-containing sulfonamide solvent contained in the electrolyte solution, the mass ratio M1 of the electrolyte lithium salt to the fluorine-containing sulfonamide solvent, the concentration M2 of the electrolyte salt, and the volume ratio M3 of the fluorine-containing sulfonamide solvent to the fluorine-containing carboxylate solvent could also be confirmed, see Table 1 for details.

The type of the fluorine-containing sulfonamide solvent is specifically as shown in Table 1. The preparation method for 2,2,2-trifluoro-N,N-dimethylethanesulfonamide (DMTESA) was as follows:

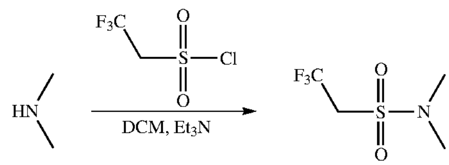

A solution of dimethylamine in tetrahydrofuran (60.3 mL, the dimethylamine was 0.121 mol), triethylamine ($Et_3N$, 12.19 g, 0.121 mol), and 120 mL of anhydrous dichloromethane (DCM) were taken, added to a 500 mL three-necked flask, and cooled to 10° C. 2,2,2-trifluoroethylsulfonyl chloride (20.0 g, 0.11 mol) in anhydrous dichloromethane (20 mL of anhydrous dichloromethane) was dropwise added, and after the dropwise addition was complete, the reaction was stirred at room temperature for 18 h. After the reaction was complete, the reaction liquid was dropwise added to ice water for quenching, extracted with dichloromethane, and concentrated under reduced pressure to remove the organic solvent, and finally, and the remaining material was distilled under reduced pressure to obtain 15.84 g of the compound N,N-dimethyl-2,2,2-trifluoroethylsulfonamide with a yield of 75.63%. The yield was calculated as follows:

$$\text{Yield} = m1/m2 \times 100\%$$

wherein m1 was the actually obtained number of moles of N,N-dimethyl-2,2,2-trifluoroethylsulfonamide, and m2 was the theoretically derived number of moles of N,N-dimethyl-2,2,2-trifluoroethylsulfonamide.

The prepared N,N-dimethyl-2,2,2-trifluoroethylsulfonamide was subjected to a hydrogen nuclear magnetic resonance spectroscopy test, a carbon nuclear magnetic resonance spectroscopy test, a fluorine nuclear magnetic resonance spectroscopy test, and a mass spectrometry test, and the results were as follows.

Hydrogen nuclear magnetic resonance spectroscopy: $^1$HNMR ($CDCl_3$, 400 MHz), δ (ppm): 3.93 (s, 2H), 2.68 (s, 6H).

Carbon nuclear magnetic resonance spectroscopy: $^{13}$CNMR ($CDCl_3$, 100 MHz), δ (ppm): 102.6, 61.9, 33.1.

Fluorine nuclear magnetic resonance spectroscopy: $^{19}$FNMR ($CDCl_3$, 376 MHz), δ (ppm): −77.3.

Mass spectrometry results: found: 191.0221. Exact Mass, calcd: 191.0228.

(2) Preparation of Negative Electrode Plate

A 12 μm copper foil was cut into a 41 mm×51 mm rectangle for use as a negative electrode plate.

(3) Preparation of Positive Electrode Plate

Preparation of positive electrode: The positive electrode active material lithium nickel cobalt manganese oxide $LiNi_{0.8}Co_{0.1}Mn_{0.1}O_2$(NCM811), the conductive agent acetylene black, and the binder PVDF were mixed in a mass ratio of 98:1:1, and the solvent NMP was added and stirred until the system was uniform to obtain a positive electrode slurry with a solid content of 80%.

The positive electrode slurry was uniformly applied to both sides of a positive electrode current collector aluminum foil, air-dried at room temperature, and transferred to an oven for continued drying. The loading of the positive electrode slurry on the electrode current collector aluminum foil was 25 mg/cm$^2$. After air drying at room temperature, the positive electrode collector aluminum foil was transferred to an oven for continued drying and then cut into a 40 mm×50 mm rectangle as a positive electrode plate.

(4) Separator film: A polyethylene porous film was selected and cut into a 45 mm×55 mm rectangle for later use.

(5) Assembly of lithium metal secondary battery: A piece of cut positive electrode plate and a piece of cut negative electrode plate were taken and matched, and the above separator film was used therebetween to isolate the positive and negative electrodes. The system was packaged into an aluminum-plastic film bag to form a stacked dry cell, and 0.3 g of the foregoing prepared electrolyte solution was injected. The aluminum-plastic film bag was subjected to hot-pressing packaging under vacuum. After standing at room temperature for 6 hours, a lithium metal secondary battery with a rated capacity of 140 mAh was obtained.

S2. Test for Performance of Lithium Metal Secondary Battery (1) Cycling Performance Test The above prepared lithium metal secondary battery was taken, charged at 0.2 C (i.e., 28 mA) at an environment temperature set to 25° C., and discharged at a rate of 1 C (i.e., 140 mA) for charge-discharge cycling. The charge and discharge cut-off voltages were set to 4.3 V and 2.8 V, respectively. The charging process was carried out using a constant current-constant voltage charging method. Specifically, after the constant current charging at 0.2 C reached a cut-off voltage of 4.3 V, charging was continued at a constant voltage of 4.3 V until the current decayed to 0.1 C (i.e., 14 mA). When the discharge capacity decayed to 80% of the first cycle discharge capacity, the life of the battery was considered to be over, and the number of cycles, Cy1@1C, was recorded.

(2) Rate Performance Test

The above prepared lithium metal secondary battery was taken. The test environment temperature was set to 25° C. Charge-discharge cycling was carried out still using the charge rate of 0.2 C (i.e., 28 mA) and using a discharge rate of 4 C (i.e., 560 mA). The charge and discharge cut-off voltages were set to 4.3 V and 2.8 V, respectively, and the charging process was a constant current-constant voltage charging method. Specifically, when constant current charging at 0.2 C reached a cut-off voltage of 4.3 V, charging was continued using a constant voltage of 4.3 V until the current decayed to 0.1 C (i.e., 14 mA). When the discharge capacity decayed to 80% of the first-cycle discharge capacity, the number of cycles, Cy@4C, was recorded.

(3) Coulombic Efficiency Test

The lithium metal secondary battery prepared above was taken. The test environment temperature was set to 25° C. A cycling test was carried out according to the cycling test steps in (1) above. The discharge capacity of each cycle was denoted as Ci, and the first-cycle charging capacity was denoted as Cact,1. The value represented the initial total amount of active lithium. The charging was terminated when the discharge capacity decayed to 80% of the first-cycle discharge capacity, and the last-cycle discharge capacity was recorded. A deep discharge test was then carried out using C/10 (7 mA), C/20 (3.5 mA), and 1 mA currents in a gradually decreasing discharge current manner, and the deep discharge capacity was recorded. The total amount of active lithium at the time of battery failure was the sum of the last-cycle discharge capacity and the deep discharge capacity, denoted as Cact,n.

The average Coulombic efficiency $CE_{ave}$ of the lithium metal secondary battery was calculated as follows:

$$CE_{ave} = 1 - \left((C_{act,1} - C_{act,n}) / \sum_{i=1}^{i=n} C_i\right)$$

(4) Sodium-Ion Conductivity Test 15 ml of the electrolyte solution prepared above was taken. The test environment temperature was set to 25° C. The test was carried out using Mettler Toledo conductivity tester. The ion conductivity of the electrolyte solution could be obtained by direct reading.

The specific results are shown in Table 1.

Examples 2-9

Examples 2-9 were substantially the same as Example 1, only except that during the preparation of the electrolyte solution in step (1), the added amount of lithium bis(fluorosulfonyl)imide salt was regulated such that M1 and M2 were different from those in Example 1.

The other step conditions were the same as those in Example 1. The test results were shown in Table 1.

Examples 10-15

Examples 10-15 were substantially the same as Example 1, only except that during the preparation of the electrolyte solution in step (1), the volume ratio M3 of the fluorine-containing sulfonamide solvent to the fluorine-containing carboxylate solvent was regulated to be different from that in Example 1.

The other step conditions were the same as those in Example 1. The test results were shown in Table 1.

Examples 16-19

Examples 16-19 were substantially the same as Example 1, only except that during the preparation of the electrolyte solution in step (1), the type of the electrolyte salt was changed to be different from that in Example 1.

The other step conditions were the same as those in Example 1. The test results were shown in Table 1.

Examples 20-24

Examples 20-24 were substantially the same as Example 1, only except that during the preparation of the electrolyte solution in step (1), the type of the fluorine-containing carboxylate solvent was regulated to be different from that in Example 1.

The other step conditions were the same as those in Example 1. The test results were shown in Table 1.

Example 25

Example 25 was substantially the same as Example 1, only except that during the preparation of the electrolyte solution in step (1), no fluorine-containing carboxylate solvent was added.

The other step conditions were the same as those in Example 1. The test results were shown in Table 1.

Example 26

Example 26 was substantially the same as Example 1, only except that during the preparation of the electrolyte solution in step (1), the fluorine-containing carboxylate solvent was replaced with an equal volume of ethylene carbonate. In this case, M3 represented the volume ratio of the fluorine-containing sulfonamide solvent to the ethylene carbonate.

The other step conditions were the same as those in Example 1. The test results were shown in Table 1.

Examples 27-31

Examples 27-31 were substantially the same as Example 1, only except that during the preparation of the electrolyte solution in step (1), the type of the fluorine-containing sulfonamide solvent was regulated to be different from that in Example 1.

The other step conditions were the same as those in Example 1. The test results were shown in Table 1.

Comparative Example 1

Comparative Example 1 was substantially the same as Example 1, only except that during the preparation of the electrolyte solution in step (1), no fluorine-containing sulfonamide solvent was added.

The other step conditions were the same as those in Example 1. The test results were shown in Table 1.

Comparative Example 2

Comparative Example 2 was substantially the same as Example 1, only except that during the preparation of the electrolyte solution in step (1), the fluorine-containing sulfonamide solvent was replaced with an equal volume of 1,1,1-trifluoro-N,N-dimethylmethanesulfonamide (denoted as 2a).

The other step conditions were the same as those in Example 1. The test results were shown in Table 1.

The structures of the fluorine-containing sulfonamide solvents used in the examples and comparative examples are as shown below:

(1a)

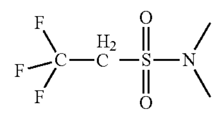

(1b)

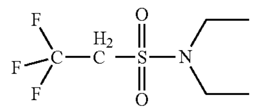

(1d)

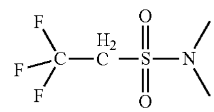

(1j)

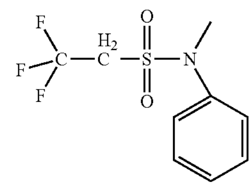

(1m)

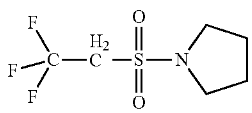

(1p)

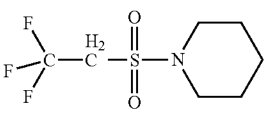

(2a)

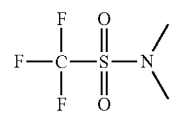

The relevant parameters and test results in each of the examples and comparative examples are as shown in Table 1, in which the mass ratio of the electrolyte lithium salt to the fluorine-containing sulfonamide solvent is M1, the concentration of the electrolyte salt is M2, and the volume ratio of the fluorine-containing sulfonamide solvent to the fluorine-containing carboxylate solvent is M3.

TABLE 1

| | Fluorine-containing carboxylate ester | Fluorine-containing sulfonamide | M3 | Lithium salt | M2 (mol/L) | M1 | Cy@1 C (Number of cycles) | $CE_{ave}$ (%) | Conductivity ($ms \cdot cm^{-1}$) | Cy@4 C (Number of cycles) |
|---|---|---|---|---|---|---|---|---|---|---|
| Example 1 | FEP | (1a) | 2:1 | LiFSI | 2 | 0.272:1 | 352 | 99.78% | 6.2 | 184 |
| Example 2 | FEP | (1a) | 2:1 | LiFSI | 0.5 | 0.068:1 | 150 | 99.2% | 7.0 | 80 |
| Example 3 | FEP | (1a) | 2:1 | LiFSI | 1 | 0.136:1 | 282 | 99.61% | 7.6 | 140 |
| Example 4 | FEP | (1a) | 2:1 | LiFSI | 1.5 | 0.204:1 | 302 | 99.7% | 6.7 | 154 |
| Example 5 | FEP | (1a) | 2:1 | LiFSI | 2.5 | 0.34:1 | 290 | 99.62% | 5.5 | 147 |
| Example 6 | FEP | (1a) | 2:1 | LiFSI | 3 | 0.408:1 | 210 | 99.40% | 4.0 | 103 |
| Example 7 | FEP | (1a) | 2:1 | LiFSI | 3.5 | 0.476:1 | 180 | 99.33% | 3.2 | 87 |
| Example 8 | FEP | (1a) | 2:1 | LiFSI | 4 | 0.544:1 | 114 | 99.12% | 2.3 | 68 |
| Example 9 | FEP | (1a) | 2:1 | LiFSI | 5 | 0.68:1 | 80 | 98.85% | 2.2 | 55 |
| Example 10 | FEP | (1a) | 0.2:1 | LiFSI | 2 | 2.45:1 | 77 | 98.88% | 2.1 | 52 |
| Example 11 | FEP | (1a) | 0.5:1 | LiFSI | 2 | 1.088:1 | 120 | 99.15% | 2.3 | 72 |
| Example 12 | FEP | (1a) | 1:1 | LiFSI | 2 | 0.362:1 | 231 | 99.44% | 5.0 | 123 |
| Example 13 | FEP | (1a) | 3:1 | LiFSI | 2 | 0.2417:1 | 287 | 99.62% | 7.2 | 142 |
| Example 14 | FEP | (1a) | 4:1 | LiFSI | 2 | 0.226:1 | 240 | 99.48% | 7.5 | 128 |
| Example 15 | FEP | (1a) | 5:1 | LiFSI | 2 | 0.217:1 | 197 | 99.37% | 8.1 | 94 |
| Example 16 | FEP | (1a) | 2:1 | LiTFSI | 2 | 0.417:1 | 188 | 99.35% | 6.5 | 88 |
| Example 17 | FEP | (1a) | 2:1 | LiPF6 | 2 | 0.221:1 | 90 | 98.8% | 6.0 | 52 |

TABLE 1-continued

| | Fluorine-containing carboxylate ester | Fluorine-containing sulfonamide | M3 | Lithium salt | M2 (mol/L) | M1 | Cy@1 C (Number of cycles) | $CE_{ave}$ (%) | Conductivity ($ms \cdot cm^{-1}$) | Cy@4 C (Number of cycles) |
|---|---|---|---|---|---|---|---|---|---|---|
| Example 18 | FEP | (1a) | 2:1 | LiBF4 | 2 | 0.1363:1 | 84 | 99% | 3.2 | 49 |
| Example 19 | FEP | (1a) | 2:1 | LiDFOB | 2 | 0.20911:1 | 102 | 99.1% | 2.3 | 61 |
| Example 20 | Ethyl 2,2,2-trifluoroacetate | (1a) | 2:1 | LiFSI | 2 | 0.272:1 | 201 | 99.38% | 2.5 | 101 |
| Example 21 | Ethyl difluoroacetate | (1a) | 2:1 | LiFSI | 2 | 0.272:1 | 145 | 99.2% | 2.7 | 75 |
| Example 22 | Methyl difluoroacetate | (1a) | 2:1 | LiFSI | 2 | 0.272:1 | 160 | 99.31% | 3.0 | 81 |
| Example 23 | Ethyl 3,3-difluoropropionate | (1a) | 2:1 | LiFSI | 2 | 0.272:1 | 220 | 99.41% | 4.7 | 118 |
| Example 24 | Propyl 3,3,3-trifluoropropionate | (1a) | 2:1 | LiFSI | 2 | 0.272:1 | 144 | 99.15% | 2.9 | 76 |
| Example 25 | | (1a) | / | LiFSI | 2 | 0.1813:1 | 153 | 99.2% | 8.2 | 84 |
| Example 26 | Ethylene carbonate | (1a) | 2:1 | LiFSI | 2 | 0.272:1 | 82 | 99% | 2.8 | 48 |
| Example 27 | FEP | (1b) | 2:1 | LiFSI | 2 | 0.0251:1 | 255 | 99.5% | 4.2 | 132 |
| Example 28 | FEP | (1d) | 2:1 | LiFSI | 2 | 0.0272:1 | 153 | 99.22% | 4.8 | 78 |
| Example 29 | FEP | (1j) | 2:1 | LiFSI | 2 | 0.0194:1 | 125 | 99.14% | 2.2 | 74 |
| Example 30 | FEP | (1m) | 2:1 | LiFSI | 2 | 0.0252:1 | 166 | 99.3% | 3.6 | 80 |
| Example 31 | FEP | (1p) | 2:1 | LiFSI | 2 | 0.0237:1 | 140 | 99.25% | 3.1 | 77 |
| Comparative Example 1 | FEP | / | / | LiFSI | 2 | / | 24 | 97.6% | 0.8 | 0 |
| Comparative Example 2 | FEP | (2a) | 2:1 | LiFSI | 2 | 0.04082:1 | 56 | 99.5% | 1.2 | 32 |

Among them, "/" means that the substance does not exist or the parameter or performance is too poor to be tested normally and obtain accurate test results.

By analyzing the data in Table 1 and comparing the test results of Example 1 and Comparative Examples 1 and 2, it can be seen that the electrolyte solution of the present application has both good anion coordination performance and good ion conductivity, and when used in the preparation of a secondary battery, it can improve both the rate performance and cycling performance of the battery.

The technical features in the foregoing embodiments can be arbitrarily combined. For the sake of brevity of description, not all possible combinations of the technical features in the above embodiments are described. However, as long as combinations of these technical features do not conflict with each other, these combinations are all considered as falling within the scope described in this specification.

The foregoing embodiments only describe several implementations of the present application, which are described relatively specifically and in detail, and thus, cannot be construed as a limitation to the scope of patent of the present disclosure. It should be noted that for those of ordinary skill in the art, a plurality of transformations and improvements can also be made without departing from the idea of the present application. These transformations and improvements all fall within the scope of protection of the present disclosure. Therefore, the patent scope of protection of the present application should be determined by the appended claims, and the specification and drawings can be used to explain the content of the claims.

What is claimed is:

1. An electrolyte solution, wherein the components of the electrolyte solution include an electrolyte salt and a fluorine-containing sulfonamide solvent, and the fluorine-containing sulfonamide solvent includes a compound represented by formula (1):

(1)

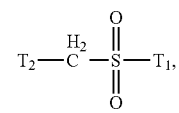

wherein $T_1$ is selected from any one of the following formulas (1-1) to (1-3):

(1-1)

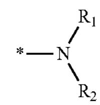

(1-2)

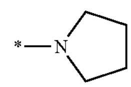

(1-3)

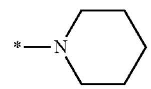

$R_1$ and $R_2$ are each independently selected from a sulfone group;

$T_2$ is fluorine-substituted alkyl having 1-4 carbon atoms; and

* represents a site of connection.

2. The electrolyte solution according to claim 1, wherein the structure of $T_2$ is as represented by (A):

(A)

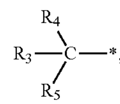

$R_3$ is selected from H, F, alkyl having 1-3 carbon atoms, or fluorine-substituted alkyl having 1-3 carbon atoms, $R_4$ and $R_5$ are each independently selected from H or F, and at least one of $R_4$ and $R_5$ is F.

3. The electrolyte solution according to claim 2, wherein $R_3$ is selected from H or F.

4. The electrolyte solution according to claim 1, wherein $T_1$ is selected from formula (1-1).

5. The electrolyte solution according to claim 1, wherein the formula (1) is one of compounds represented by formulas (1m) to (1r):

(1m)

(1n)

(1o)

(1p)

(1q)

(1r)

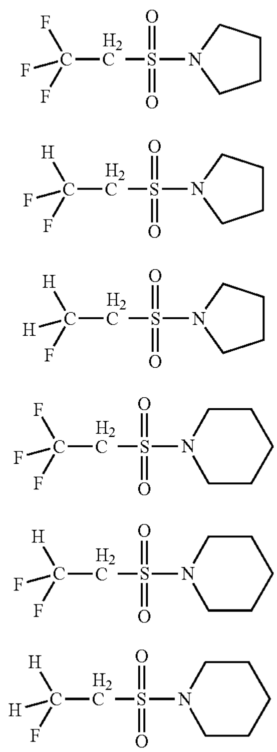

6. The electrolyte solution according to claim 1, wherein;

the components of the electrolyte solution further comprise a fluorine-containing carboxylate ester solvent;

the fluorine-containing carboxylate ester solvent comprises a compound represented by formula (B):

(B)

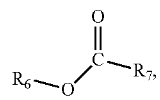

$R_6$ and $R_7$ are each independently selected from alkyl having 1-5 carbon atoms, and at least one of $R_6$ and $R_7$ is fluorine-substituted alkyl having 1-5 carbon atoms.

7. The electrolyte solution according to claim 6, wherein a volume ratio of the fluorine-containing sulfonamide solvent to the fluorine-containing carboxylate ester solvent is (0.2-5):1.

8. The electrolyte solution according to claim 6, wherein a volume ratio of the fluorine-containing sulfonamide solvent to the fluorine-containing carboxylate ester solvent is (0.5-3):1.

9. The electrolyte solution according to claim 6, wherein a volume ratio of the fluorine-containing sulfonamide solvent to the fluorine-containing carboxylate ester solvent is (1.5-2.25): 1.

10. The electrolyte solution according to claim 1, wherein in the electrolyte solution, a mass ratio of the electrolyte salt to the fluorine-containing sulfonamide solvent is (0.068-0.68): 1.

11. The electrolyte solution according to claim 1, wherein the electrolyte solution satisfies at least one of the following conditions (a) to (b):

(a) in the electrolyte solution, a concentration of the electrolyte salt is 0.5-5 mol/L; and (b) the electrolyte salt includes a lithium-ion electrolyte salt.

12. The electrolyte solution according to claim 11, wherein the lithium-ion electrolyte salt includes at least one of lithium bis(fluorosulfonyl)imide, lithium hexafluorophosphate, lithium tetrafluoroborate, lithium hexafluoroarsenate, lithium bis(trifluoromethanesulfonyl)imide, lithium trifluoromethanesulfonate, lithium difluorophosphate, lithium bis(oxalato)borate, lithium difluoro(oxalato)borate, lithium difluorobis(oxalato)phosphate, and lithium tetrafluoro(oxalato) phosphate.

13. A secondary battery, comprising the electrolyte solution according to claim 1.

14. The secondary battery according to claim 13, wherein the secondary battery includes a lithium metal secondary battery.

15. An electrical apparatus, comprising the electrolyte solution according to claim 1.

* * * * *